United States Patent
Hubacek et al.

(10) Patent No.: US 7,378,038 B2
(45) Date of Patent: *May 27, 2008

(54) PROCESS FOR PRODUCING PHOSPHORS

(75) Inventors: Milan Hubacek, Kanagawa-ken (JP); Kenji Takahashi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 165 days.

This patent is subject to a terminal disclaimer.

(21) Appl. No.: 10/909,374

(22) Filed: Aug. 3, 2004

(65) Prior Publication Data

US 2005/0029495 A1 Feb. 10, 2005

(30) Foreign Application Priority Data

Aug. 4, 2003 (JP) ............................. 2003-285788

(51) Int. Cl.
*C09K 11/08* (2006.01)

(52) U.S. Cl. ...................... 252/301.4 S; 252/301.6 S; 252/301.4 F; 252/301.6 F; 252/301.5; 252/301.4 R; 252/301.6 R; 252/301.4 P; 252/301.6 P

(58) Field of Classification Search ......... 252/301.4 S, 252/301.6 S, 301.4 F, 301.6 F, 301.5, 301.4 R, 252/301.6 R, 301.4 P, 301.6 P
See application file for complete search history.

(56) References Cited

U.S. PATENT DOCUMENTS 6,274,110 B1   8/2001   Kim et al.
7,009,337 B2 *  3/2006   Urabe ........................ 313/503

* cited by examiner

*Primary Examiner*—C. Melissa Koslow
(74) *Attorney, Agent, or Firm*—Sughrue Mion, PLLC

(57) ABSTRACT

A mixed melt, which contains urea and/or a urea derivative and contains a metal compound, is prepared. The mixed melt is solidified, by heating, whereby the urea and/or urea derivative is decomposed, a precursor being thereby prepared. The thus prepared precursor is ground, and then the thus ground precursor is fired. The metal of the metal compound may be at least one kind of a metal selected from the group consisting of Al, B, Ba, Be, Bi, Ca, Cd, Cs, Ga, Ge, Hf, In, K, Li, Mg, Mo, Na, Nb, P, Rb, Si, Sn, Sr, Ta, Ti, V, W, Zr, and rare earth metals. A finely powdered phosphor free from inclusion of impurities and having uniform particle size is thus produced at a low cost and efficiently.

6 Claims, No Drawings

PROCESS FOR PRODUCING PHOSPHORS

BACKGROUND OF THE INVENTION

1. Field of the Invention

This invention relates to a process for producing a phosphor. This invention particularly relates to a process for producing various kinds of phosphors with a urea melting technique.

2. Description of the Related Art

Phosphors to be utilized for cathode ray tubes, X-ray intensifying screens, and the like, have heretofore been obtained with techniques, in which powdered raw materials are mixed together, the mixture of the powdered raw materials is introduced into a firing vessel, such as a crucible, and heated at a high temperature for a long period of time, a phosphor is thus formed with a solid phase reaction, the thus formed phosphor is pulverized with a ball mill, or the like, and the thus obtained phosphor particles are subjected to classification.

However, with the techniques utilizing the solid phase reaction, it is necessary for the mixing to be performed for a long period of time, and it is necessary for the firing to be performed for a comparatively long period of time even at a high temperature. Also, the techniques utilizing the solid phase reaction have the problems in that the powdered raw materials are not always capable of being mixed uniformly, and in that a phosphor having reliable quality is not always capable of being obtained. Further, during the pulverization processing performed after the solid phase reaction, the phosphor is subjected to physical and chemical impacts. Therefore, the problems occur in that defects occur within the phosphor particles and on surfaces of the phosphor particles and cause light emission intensity of the phosphor to become low. Furthermore, with the techniques utilizing the solid phase reaction, wherein the powdered raw materials are heated at a high temperature for a long period of time within the firing vessel, such as the crucible, the problems occur in that impurities enter from the firing vessel into the phosphor and cause the light emission intensity of the phosphor to become low. The problems also occur in that the solid phase reaction does not progress sufficiently, depending upon the particle size of the powder raw materials, and impurity phases are mixed in the obtained phosphor and cause the light emission intensity of the phosphor to become low. Further, with the techniques utilizing the solid phase reaction, wherein the powdered raw materials are heated at a high temperature for a long period of time, the amount of energy required is not capable of being kept small, and the cost of the phosphor is not capable of being kept low.

Besides the aforesaid techniques utilizing the solid phase reaction, techniques utilizing liquid phase reaction, such as a pyrolysis technique, a co-precipitation technique, and a metal alkoxide technique, have also been known. With the techniques utilizing the liquid phase reaction, a solid-state intermediate product is obtained from a uniform mixed solution of soluble constituents and is then subjected to heat processing. Therefore, the techniques utilizing the liquid phase reaction have the advantages over the techniques utilizing the solid phase reaction in that synthesis is capable of being performed at a comparatively low temperature, and in that the quality of the obtained phosphor is uniform. However, the techniques utilizing the liquid phase reaction have the problems in that complicated production processes are required, and therefore there is a high possibility of impurities being mixed into the obtained phosphor. The techniques utilizing the liquid phase reaction also have the problems in that limitation is imposed upon the kinds of the raw materials.

A sol-gel technique has also been known. With the sol-gel technique, a metal alkoxide is used as a raw material, and a sol, in which fine particles of a metal oxide or a metal hydroxide have been dispersed, is obtained with hydrolysis and polymerization reaction. The reaction is then allowed to progress even further in order to obtain a gel, the thus obtained gel is fired, and fine particles of a metal oxide are thereby obtained. However, the sol-gel technique has the problems in that complicated production processes are required, and therefore the technique is not appropriate for mass production. Also, the sol-gel technique has the problems in that a precursor is unstable and is difficult to processing.

Further, a spray drying technique has been known. With the spray drying technique, a solution containing metal elements acting as constituents of a phosphor is sprayed into a carrier gas by use of an ultrasonic nebulizer, or the like, and fine droplets of the solution are thus formed and dried into metal salt particles or metal complex particles. The metal salt particles or the metal complex particles having thus been obtained are then subjected to pyrolytic synthesis, and the phosphor is thereby obtained. However, the spray drying technique has the problems in that the quality of the obtained phosphor is not capable of being kept high due to the presence of pores within the powder.

As one of techniques, which have the advantages of both the solid phase technique and the liquid phase technique, a burning technique has heretofore been known. With the burning technique, after a metal nitrate and urea have been mixed together, the resulting mixture is heated to a comparatively low temperature (approximately 500° C.) in a reaction furnace, and a decomposition gas is burned. Powder of a composite oxide is thus obtained quickly and easily. However, with the burning technique, burning conditions vary in accordance with a rate of heating of the mixture, a mixing ratio between the raw materials, a shape of the reaction furnace, a volume of the reaction furnace, and the like, and therefore quantitative synthesis conditions are not capable of being obtained. Also, the burning technique has the problems in that uniform burning is not always kept, and therefore the quality of the obtained product is not capable of being kept at predetermined quality.

A technique for producing a composite oxide, which has reliable quality, at a low cost and efficiently is described in, for example, U.S. Pat. No. 6,274,110. With the technique described in U.S. Pat. No. 6,274,110, a metal nitrate or a solution containing the metal nitrate is mixed with urea or carbohydrazide, the resulting mixture is heated to a temperature falling within a range such that the mixture does not become ignited, a composite oxide precursor is thus prepared, and the composite oxide precursor is heated.

However, the higher order compound described in U.S. Pat. No. 6,274,110 is the composite oxide alone. Also, the composite oxide, which is obtained with the technique described in U.S. Pat. No. 6,274,110, is constituted of the powder composed of aggregates of particles having irregular shapes. Therefore, in cases where a phosphor slurry containing the composite oxide is coated in order to form a phosphor film, a heterogeneous phosphor film having a low packing density is obtained. The thus obtained phosphor film exhibits a low light emission intensity. In cases where coarse particles of the composite oxide are removed with a classifying operation, the sizes of the particles of the composite oxide may be capable of being trued up to the particle sizes falling within a certain range. However, the classifying operation is of bad workability and causes the yield to become low.

Also, as for phosphors containing a silicate as a principal phase, the phosphors have heretofore been produced with the techniques utilizing the solid phase reaction. With the techniques utilizing the solid phase reaction, it is necessary for the raw materials for the phosphors to be fired at a temperature as high as at least 1,500° C. Also, the techniques utilizing the solid phase reaction have the problems in that the raw materials are not always capable of being mixed uniformly. Further, during the pulverization processing performed after the solid phase reaction, the phosphor is subjected to physical and chemical impacts. Therefore, the problems occur in that defects occur within the phosphor particles and on surface of the phosphor particles and cause light emission intensity of the phosphor to become low. In U.S. Pat. No. 6,274,110, Si is described as a metal, but nothing is suggested as for a production example. This is presumably because an Si source dissolved in urea melt had not been found out.

SUMMARY OF THE INVENTION

The primary object of the present invention is to provide a process for producing a phosphor, wherein a finely powdered phosphor free from inclusion of impurities and having uniform particle size is capable of being produced at a low cost and efficiently.

Another object of the present invention is to provide a process for producing a phosphor, wherein a phosphor exhibiting a high light emission intensity is capable of being produced.

A further object of the present invention is to provide a process for producing a phosphor containing a silicate as a principal phase, wherein a urea melting technique is employed.

A still further object of the present invention is to provide a process for producing a phosphor containing a silicate as a principal phase, wherein a phosphor containing a silicate as a principal phase, which phosphor exhibits a high light emission intensity, is capable of being produced at a low cost and efficiently.

The present invention provides a process for producing a phosphor, comprising the steps of: i) preparing a mixed melt, which contains urea and/or a urea derivative and contains a metal compound, solidifying the mixed melt by heating, whereby the urea and/or urea derivative is decomposed, a precursor being thereby prepared, iii) grinding the thus prepared precursor, and iv) firing the thus ground precursor.

Examples of preferable urea derivatives include thiourea, carbohydrazide, benzene sulfonyl hydrazide, trimethylurea, triethylurea, tetramethylurea, tetraethylurea, triphenylurea, and tetraphenylurea.

As the metal compound, basically, one of metal compounds, which are capable of being dissolved in the melt of the urea derivative, may be utilized. The metal may be a typical element, such as Mg, Ca, Al, or Si; a noble metal element, such as Cu or Ag; a transition metal element, such as Ti or Zr; or a rare earth element. The compound of the metal should preferably be an inorganic salt, such as a nitrate, or an organic acid salt, which has the characteristics of being decomposed with heat. Also, the inorganic salt, such as the nitrate, or the organic acid salt has the advantages in that the salt readily forms an oxide through decomposition and is readily reduced to form a metal itself, a carbide, a boride, or a nitride.

By way of example, the metal of the metal compound should preferably be at least one kind of a metal selected from the group consisting of Al, B, Ba, Be, Bi, Ca, Cd, Cs, Ga, Ge, Hf, In, K, Li, Mg, Mo, Na, Nb, P, Rb, Si, Sn, Sr, Ta, Ti, V, W, Zr, and rare earth metals (such as Sc, Y, La, Ce, Pr, Nd, Sm, Eu, Gd, Tb, Dy, Ho, Er, Tm, Yb, and Lu).

Also, the phosphor should preferably be a phosphor containing a sulfide or an oxysulfide as a principal phase.

Alternatively, the phosphor should preferably be a phosphor containing a tantalate as a principal phase.

The present invention also provides a process for producing a phosphor containing a silicate as a principal phase, comprising the steps of: i) preparing a mixed melt, which contains urea and/or a urea derivative and contains a metal compound and $SiO_2$, ii) solidifying the mixed melt by heating, whereby the urea and/or urea derivative is decomposed, a silicate precursor being thereby prepared, and iii) firing the thus prepared silicate precursor.

The process for producing a phosphor containing a silicate as a principal phase should preferably be modified such that, before the silicate precursor is fired, the silicate precursor is ground.

With the process for producing a phosphor in accordance with the present invention, the melt of urea and/or the urea derivative is used as a solvent. Therefore, at the time at which urea and/or the urea derivative is decomposed, and the melt is solidified, metal ions contained in the melt do not readily agglomerate. Accordingly, the phosphor is capable of being produced, while the metal compound is being kept in a well dispersed state.

Also, with the process for producing a phosphor in accordance with the present invention, the temperature of the mixed melt, which contains urea and/or the urea derivative and contains the metal compound, is raised, the mixed melt is solidified, and the precursor is thereby prepared. After the thus prepared precursor has been ground, the thus ground precursor is fired. Therefore, a finely powdered phosphor is capable of being obtained. Specifically, the precursor contains resin constituents, which have been formed through the decomposition of urea, and the like. In cases where the precursor is fired without being ground, the particles will fuse together during the firing, and a phosphor of a submicron size will not be capable of being obtained. However, with the process for producing a phosphor in accordance with the present invention, wherein the precursor is ground and is thereafter fired, the finely powdered phosphor is capable of being obtained. Therefore, since pulverization processing, which is conducted after the reaction as in the techniques utilizing the solid phase reaction, need not be performed, the phosphor does not suffer from physical and chemical impacts, and defects do not occur within the phosphor particles or on the surfaces of the phosphor particles. Accordingly, a phosphor exhibiting a high light emission intensity is capable of being produced. In cases where a phosphor film is formed with the phosphor having been produced with the process for producing a phosphor in accordance with the present invention, a phosphor film in which the phosphor particles are homogeneous and have been packed at a high packing density is capable of being obtained. Therefore, a phosphor film exhibiting a high light emission intensity is capable of being obtained.

Further, with the process for producing a phosphor in accordance with the present invention, in cases where a phosphor having been activated with an activator or a co-activator is to be produced, the metal compound and a metal compound, or the like, which is capable of acting as the activator or the co-activator, are capable of being uniformly introduced into the mixed melt. Therefore, a particular operation for firing at a high temperature in order to introduce the activator, or the like, uniformly need not be performed. As a result, the amount of energy required to produce the phosphor is capable of being kept small, and the production cost is capable of being kept low.

As for phosphors containing a silicate as a principal phase, the phosphors have heretofore been produced with the techniques utilizing the solid phase reaction. With the techniques utilizing the solid phase reaction, the problems occur in that a phosphor having reliable quality is not capable of being obtained. However, with the process for producing a phosphor containing a silicate as a principal phase in accordance with the present invention, wherein the metal compound and $SiO_2$ are dispersed in urea and/or the urea derivative having been melted, the phosphor is capable of being produced, while the metal ions and the $SiO_2$ are being kept in a well dispersed state. Therefore, the phosphor having reliable quality is capable of being obtained. Also, since the activator, or the like, is capable of being introduced uniformly, a particular operation for firing at a high temperature need not be performed. The phosphor is thus capable of being produced at a markedly lower temperature than with the techniques utilizing the solid phase reaction. As a result, the amount of energy required to produce the phosphor is capable of being kept small, and the production cost is capable of being kept low.

With the modification of the process for producing a phosphor containing a silicate as a principal phase in accordance with the present invention, the silicate precursor having been prepared by raising the temperature of the mixed melt, which contains urea and/or the urea derivative and contains the metal compound and $SiO_2$, is ground before being fired. With the modification described above, a more finely powdered phosphor is capable of being obtained. Also, since pulverization processing, which is conducted after the reaction as in the techniques utilizing the solid phase reaction, need not be performed, the phosphor does not suffer from physical and chemical impacts. Therefore, defects do not occur within the phosphor particles or on the surfaces of the phosphor particles. Accordingly, the phosphor containing the silicate as the principal phase, which phosphor exhibits a high light emission intensity, is capable of being produced.

DETAILED DESCRIPTION OF THE INVENTION

The process for producing a phosphor in accordance with the present invention comprises the steps of: (i) preparing a mixed melt, which contains urea and/or a urea derivative and contains a metal compound, (ii) raising a temperature of the mixed melt, (iii) solidifying the mixed melt, a precursor being thereby prepared, (iv) grinding the thus prepared precursor, and (v) firing the thus ground precursor.

Examples of the metals of the metal compounds include Al, B, Ba, Be, Bi, Ca, Cd, Cs, Ga, Ge, Hf, In, K, Li, Mg, Mo, Na, Nb, P, Rb, Si, Sn, Sr, Ta, Ti, V, W, Zr, and rare earth metals. One of the metals enumerated above may be used alone, or two or more of the metals enumerated above may be used in combination.

For example, in order for the physical properties or the chemical properties of the phosphor to be altered, besides urea and/or the urea derivative and the metal compound, the mixed melt may also contain doping agents and various kinds of additives, such as an activator or a co-activator, which takes part in light emission, and a fusing agent for promoting crystal growth and diffusion of impurities.

Various phosphors produced with the process in accordance with the present invention will be described hereinbelow. In cases where a phosphor containing a sulfide as a principal phase is to be produced, a mixed melt, which contains urea and/or the urea derivative and contains a sulfur source, is prepared. Also, the temperature of the mixed melt is raised, and the mixed melt is solidified, a precursor being thereby prepared. Further, the thus prepared precursor is ground, and the thus ground precursor is fired. The phosphor containing the sulfide as the principal phase is also capable of being produced by using thiourea as the urea derivative or by using urea and thiourea together. Also, as the sulfur source, a metal sulfate or $(NH_4)_2SO_4$ may be used. In cases where a material other than metal sulfate is used as the sulfur source, the metal compound described above need not necessarily be a sulfate and may be, for example, a nitrate or an acetate.

No limitation is imposed upon the composition of the phosphor containing the sulfide as the principal phase, which phosphor is produced with the process for producing a phosphor in accordance with the present invention. Examples of the compositions of the phosphors containing the sulfide as the principal phase include CaS, (Zn,Cd)S, $SrGa_2S_4$, and SrS. Examples of the compositions of the phosphors containing the sulfide as the principal phase also include activated phosphor compositions, such as CaS:Eu, Sm, CaS:Mn, SrS:Eu,Sm, and SrS:Mn.

In cases where a phosphor containing an oxysulfide as a principal phase is to be produced, a mixed melt, which contains urea and/or the urea derivative and contains a sulfur source and a metal compound, is prepared. Also, the temperature of the mixed melt is raised, and the mixed melt is solidified, a precursor being thereby prepared. Further, the thus prepared precursor is ground, and the thus ground precursor is fired. The phosphor containing the oxysulfide as the principal phase is also capable of being produced by using thiourea as the urea derivative or by using urea and thiourea together. Also, as the sulfur source, a metal sulfate or $(NH_4)_2SO_4$ may be used. In cases where a material other than metal sulfate is used as the sulfur source, the metal compound described above need not necessarily be a sulfate and may be, for example, a nitrate or an acetate.

No limitation is imposed upon the composition of the phosphor containing the oxysulfide as the principal phase, which phosphor is produced with the process for producing a phosphor in accordance with the present invention. Examples of the compositions of the phosphors containing the oxysulfide as the principal phase include $Y_2O_2S$, $Gd_2O_2S$, (Y, Eu) $O_2S$, and activated $Gd_2O_2S$:Tb.

In cases where a phosphor containing a tantalate as a principal phase is to be produced, a mixed melt, which contains urea and/or the urea derivative and contains a tantalate and a metal compound, is prepared. Also, the temperature of the mixed melt is raised, and the mixed melt is solidified, a precursor being thereby prepared. Further, the thus prepared precursor is ground, and the thus ground precursor is fired.

No limitation is imposed upon the composition of the phosphor containing the tantalate as the principal phase, which phosphor is produced with the process for producing a phosphor in accordance with the present invention. Examples of the compositions of the phosphors containing the tantalate as the principal phase include $YTaO_4$, $LuTaO_4$, [Y,Sr]$TaO_4$, [Lu,Sr]$TaO_4$, and $GdTaO_4$. Examples of the compositions of the phosphors containing the tantalate as the principal phase also include activated phosphor compositions, such as YTaO$_4$: Tm, YTaO$_4$:Nb, [Y,Sr]TaO$_4$:Nb, LuTaO$_4$:Nb, [Lu,Sr]TaO$_4$:Nb, and GdTaO$_4$:Tm.

In cases where a phosphor containing a silicate as a principal phase is to be produced, a mixed melt, which contains urea and/or the urea derivative and contains a metal compound and SiO$_2$, is prepared. Also, the temperature of the mixed melt is raised, and the mixed melt is solidified, a silicate precursor being thereby prepared. Further, the thus prepared silicate precursor is ground, and the thus ground silicate precursor is fired.

In cases where the silicate precursor having been prepared by raising the temperature of the mixed melt, which contains urea and/or the urea derivative and contains the metal compound and SiO$_2$, and solidifying the mixed melt is ground before being fired, a more finely powdered phosphor is capable of being obtained.

No limitation is imposed upon the composition of the phosphor containing the silicate as the principal phase, which phosphor is produced with the process for producing a phosphor in accordance with the present invention. Examples of the compositions of the phosphors containing the silicate as the principal phase include Y$_2$SiO$_5$, activated Y$_2$SiO$_5$:Ce,Sm, Zn$_2$SiO$_4$, activated Zn$_2$SiO$_4$:Mn, and activated Lu$_2$SiO$_5$:Ce.

How the phosphor is produced with the process for producing a phosphor in accordance with the present invention will be described hereinbelow.

The mixed melt, which contains urea and/or the urea derivative and contains the metal compound, may be prepared in the manner described below. Specifically, urea and/or the urea derivative and the metal compound are introduced into a reaction vessel, such as a separable flask, and heated to a temperature equal to at least the melting temperature of urea (135° C.) (in the cases of thiourea, at least the melting temperature of thiourea, 180° C.; or in the cases of carbohydrazide, at least the melting temperature of carbohydrazide, 152° C. to 153° C.). In cases where a doping agent or various kinds of additives are to be added, the doping agent or the additives may be added at the stage at which the metal compound has been mixed with urea and/or the urea derivative. Alternatively, the doping agent or the additives may be added after the melt has been formed.

The metal compound is dissolved in the melt of urea and/or the urea derivative, and a uniform mixed melt is formed. The mixing ratio of urea and/or the urea derivative to the metal compound may vary in accordance with the kind of the metal compound. In order for a uniform melt to be obtained, the mixing ratio of urea and/or the urea derivative: the metal compound should preferably be at least 1:1 (molar ratio).

The temperature of the mixed melt, which contains urea and/or the urea derivative and contains the metal compound, is raised to temperature equal to at least the melting temperature of urea and/or the urea derivative. In order for a precursor, which is easy to grind, to be obtained, the heating temperature should preferably be raised to a temperature falling within the range of 410° C. to 600° C., and should more preferably be raised to a temperature falling within the range of 420° C. to 500° C., and the mixed melt should preferably be thus solidified. The heating time may vary in accordance with the heating temperature. The heating time should preferably fall within the range of 10 minutes to 24 hours, and should more preferably fall within the range of 1 hour to 12 hours. In order for the temperature of the mixed melt to be raised, the mixed melt, which has been prepared by the addition of the metal compound to urea and/or the urea derivative having been melted, may be heated with stirring. The heating of the mixed melt may be performed such that the temperature of the mixed melt is kept at a predetermined temperature during the heating, or such that the temperature of the mixed melt is raised gradually. The heating atmosphere may be an oxidizing atmosphere, such as the air; a neutral atmosphere, such as an N$_2$ gas atmosphere or an Ar gas; or a vacuum.

During the heating step, urea and/or the urea derivative and the metal compound, which are contained in the mixed melt, decompose to yield the precursor of the phosphor. The precursor contains the organic constituents, which have been formed through the decomposition of urea and/or the urea derivative. Therefore, in order for the finely powdered phosphor to be obtained, the organic constituents are subjected to the grinding processing performed with an ordinary grinding technique utilizing a ball mill, a jet mill, a pin mill, or the like.

Thereafter, the precursor is fired. By way of example, the firing may be performed with a technique, wherein the precursor is filled in a heat-resistant vessel, such as a quartz boat, an alumina crucible, or a quartz crucible, and the heat-resistant vessel containing the precursor is set at a furnace core of an electric furnace. The firing temperature may vary in accordance with the state of the precursor, the kind of the metal compound, and the like. The firing temperature may fall within the range of 600° C. to 1,300° C. The firing temperature should preferably fall within the range of 700° C. to 1,200° C., and should more preferably fall within the range of 800° C. to 1,100° C. The firing time may vary in accordance with the firing temperature. The firing time may fall within the range of 10 minutes to 100 hours, and should preferably fall within the range of 30 minutes to 10 hour. The firing atmosphere may be an oxidizing atmosphere, such as the air; a neutral, such as an N$_2$ gas or an Ar gas; a weakly oxidic atmosphere containing a small amount of O$_2$ in a neutral gas; a weakly reducing atmosphere, which is formed in cases where the precursor and carbon are put in a covered firing vessel and fired in the air; a weakly reducing atmosphere containing ammonia or H$_2$; or vacuum.

In cases where the precursor is subjected to the firing processing, decomposition products in the precursor, which decomposition products have been formed during the firing processing, are capable of being dissipated, and the phosphor is capable of being produced. In cases where the doping agent has been added to the mixed melt, or in cases where, besides the metal compound acting as the matrix of the phosphor, a compound of Mn or a rare earth metal acting as the activator or a co-activator has been selected as the metal compound, the doping agent, or the like, is uniformly dispersed and contained in the metal acting as the matrix of the phosphor during the heating processing and the firing processing described above and thus activates the phosphor. The particle diameter of the thus obtained phosphor may fall within the range of 50 nm to 10 µm, and should preferably fall within the range of 100 nm to 3 µm.

EXAMPLES

The present invention will further be illustrated by the following nonlimitative examples.

Example 1

A mixture containing 90 g of urea and 12 g of CaSO$_4$.2H$_2$O was put in a separable flask, warmed to a temperature of 150° C., and thus melted. Thereafter, 0.01132 g of $Eu(NO_3)_3.6H_2O$ and 0.00154 g of $Sm(NO_3)_3.yH_2O$ were added in the form of a diluted aqueous solution to the resulting melt and dissolved. The resulting mixture began solidifying before the temperature came up to 190° C. When the temperature raising was continued until the temperature came up to 450° C., a white, soft, foam-like precursor was obtained. An X-ray structure analysis revealed that the precursor exhibited no CaS diffraction pattern. After the precursor was ground with a ball mill, the temperature of the thus ground precursor was raised to 1,000° C. in a vacuum heating furnace. A CaS:Eu,Sm phosphor obtained as a final product was high-quality pink powder and exhibited red photoluminescence and photostimulated lumicescence. A structure analysis revealed that the powder was constituted of approximately 80% of CaS and approximately 20% of CaO.

Example 2

Experiments were performed in the same manner as that in Example 1, except that $(NH_4)_2SO_4$ was further added to the mixture prepared in Example 1. A CaS:Eu,Sm phosphor was obtained as deep pink powder. With an X-ray diffraction analysis, no CaO peak was observed.

Example 3

A mixture containing 90 g of urea, 15 g of $Ca(NO_3)_2.4H_2O$, and 0.05 g of $Mn(NO_3)_2.6H_2O$ was put in a separable flask, warmed to a temperature of 150° C., and thus melted into a transparent liquid product. Thereafter, 50 g of thiourea was added to the transparent liquid product. As a result, a viscous solidified material was formed slowly. When the temperature raising was continued until the temperature came up to 450° C., a precursor exhibiting no CaS peak in the X-ray diffraction pattern was obtained. After the precursor was ground in a ball mill, the thus ground precursor was subjected to vacuum firing at a temperature of 1,000° C. The thus produced material was CaS:Mn white powder exhibiting orange photoluminescence.

Example 4

Firstly, 50 g of urea, 3 g of $Lu(NO_3)_3.4H_2O$, 0.22 g of ultrafine $SiO_2$ particles (aerosol), and 0.0014 g of $Ce(SO_4)_2.4H_2O$ were mixed together. The resulting mixture was put in a separable flask, warmed to a temperature of 190° C., and a transparent melt was thus prepared. The thus prepared melt was stirred until it became viscous. Thereafter, the heating of the melt was continued without stirring until the temperature came up to 450° C. The thus obtained precursor was ground, and the ground precursor was fired at a temperature of 1,000° C. for two hours in the air atmosphere. An analysis revealed that the product was an $Lu_2SiO_5$:Ce phosphor, which exhibited blue photoluminescence.

Example 5

Firstly, 100 g of urea, 20 g of ZnO, 8.856 g of ultrafine $SiO_2$ particles (aerosol), and 0.116 g of $Mn(NO_3)_2.6H_2O$ were put in a separable flask and mixed together. The resulting mixture was warmed to a temperature of 200° C. while being stirred, and a transparent melt was thus prepared. The temperature of the thus prepared melt was raised to 450° C. A solid product acting as a precursor was thus obtained. After the thus obtained solid product was ground, the thus ground product was fired at a temperature of 1,000° C. for two hours in the air atmosphere. Thereafter, the thus fired product and carbon were put in a covered vessel and re-heated at the same temperature for the same time in the air atmosphere. As a result of structure analysis, a zinc silicate represented by the formula $Zn_2SiO_4$ was observed. The product was a $Zn_2SiO_4$:Mn phosphor and exhibited green photoluminescence.

Example 6

Firstly, 100 g of urea, 20 g of $Y(NO_3)_3.6H_2O$, and 20 g of $(NH_4)_2SO_4$ were put in a separable flask and mixed together. The temperature of the resulting mixture was raised to 150° C. At the time at which the mixture was melted perfectly, 0.025 g of $Eu(NO_3)_3.xH_2O$ was added in a diluted form to the resulting melt. The temperature of the resulting mixture was raised to 450° C. A liquid product having thus been obtained was subjected to grinding processing and then subjected to vacuum firing at a temperature of 1,000° C. for two hours. As a result of structure analysis, an oxysulfide represented by the formula $Y_2O_2S$ was observed. The product was a $Y_2O_2S$:Eu phosphor and exhibited red photoluminescence.

Example 7

Firstly, 100 g of urea, 20 g of $Y(NO_3)_3.6H_2O$, and 20 g of thiourea were put in a separable flask and mixed together. The temperature of the resulting mixture was raised to 150° C. At the time at which the mixture was melted perfectly, 0.025 g of $Eu(NO_3)_3.6H_2O$ was added in a diluted form to the resulting melt. The temperature of the resulting mixture was raised to 450° C. After a precursor having thus been obtained was cooled, the precursor was ground and then subjected to vacuum firing at a temperature of 1,000° C. As a result of structure analysis, an oxysulfide represented by the formula $Y_2O_2S$ was observed. The product was a $Y_2O_2S$:Eu phosphor and exhibited red photoluminescence.

As described above, with the process for producing a phosphor in accordance with the present invention, the melt of urea and/or the urea derivative is utilized as a solvent. Therefore, at the time at which urea and/or the urea derivative decomposes, and the melt is solidified, the metal ions contained in the melt are not apt to agglomerate. The phosphor is thus capable of being produced while the metal compound is kept in a well dispersed state.

Also, with the process for producing a phosphor in accordance with the present invention, the temperature of the mixed melt, which contains urea and/or the urea derivative and contains the metal compound, is raised, the mixed melt is solidified, and the precursor is thereby prepared. After the thus prepared precursor has been ground, the thus ground precursor is fired. Therefore, a finely powdered phosphor is capable of being obtained. Further, with the process for producing a phosphor in accordance with the present invention, the metal compound and a metal compound capable of acting as the activator, or the like, are capable of being uniformly introduced into the mixed melt. Therefore, a particular operation for firing at a high temperature in order to introduce the activator, or the like, uniformly need not be performed. As a result, the amount of energy required to produce the phosphor is capable of being kept small, and the production cost is capable of being kept low.

What is claimed is:

1. A process for producing a phosphor, comprising the steps of:
   i) preparing a mixed melt, which contains urea and/or a urea derivative and contains a metal compound,
   ii) solidifying the mixed melt by heating, whereby the urea and/or urea derivative is decomposed, a precursor being thereby prepared,
   iii) grinding the thus prepared precursor, and
   iv) firing the thus ground precursor.

2. A process for producing a phosphor as defined in claim 1 wherein the metal of the metal compound is at least one kind of a metal selected from the group consisting of Al, B, Ba, Be, Bi, Ca, Cd, Cs, Ga, Ge, Hf, In, K, Li, Mg, Mo, Na, Nb, P, Rb, Si, Sn, Sr, Ta, Ti, V, W, Zr, and rare earth metals.

3. A process for producing a phosphor as defined in claim 1 wherein the mixed melt further contains a sulfur source, and wherein the phosphor is a phosphor containing a sulfide or an oxysulfide as a principal phase.

4. A process for producing a phosphor as defined in claim 1 wherein the mixed melt further contains a tantalate source, and wherein the phosphor is a phosphor containing a tantalate as a principal phase.

5. A process for producing a phosphor containing a silicate as a principal phase, comprising the steps of:
   i) preparing a mixed melt, which contains urea and/or a urea derivative and contains a metal compound and $SiO_2$,
   ii) solidifying the mixed melt by heating, whereby the urea and/or urea derivative is decomposed, a silicate precursor being thereby prepared, and
   iii) firing the thus prepared silicate precursor.

6. A process for producing a phosphor containing a silicate as a principal phase as defined in claim 5 wherein, before the silicate precursor is fired, the silicate precursor is ground.

* * * * *